(12) United States Patent
Cao et al.

(10) Patent No.: US 10,574,778 B2
(45) Date of Patent: Feb. 25, 2020

(54) CONTENT REPLACEMENT AND REFRESH POLICY IMPLEMENTATION FOR A CONTENT DISTRIBUTION NETWORK

(71) Applicant: Citrix Systems, Inc., Fort Lauderdale, FL (US)

(72) Inventors: Yang Cao, Westford, MA (US); Michael Nicolazzo, Philadelphia, PA (US); William M. Turner, Higganum, CT (US); Talbot Hack, Ann Arbor, MI (US); Moshe Suberri, Voorhees, NJ (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 15/688,424

(22) Filed: Aug. 28, 2017

(65) Prior Publication Data

US 2017/0359436 A1 Dec. 14, 2017

Related U.S. Application Data

(63) Continuation of application No. 14/950,896, filed on Nov. 24, 2015, now Pat. No. 9,769,277, which is a (Continued)

(51) Int. Cl.
*H04L 29/08* (2006.01)
*G06F 12/121* (2016.01)
*H04L 12/26* (2006.01)

(52) U.S. Cl.
CPC ........ *H04L 67/2842* (2013.01); *G06F 12/121* (2013.01); *H04L 43/0852* (2013.01); *H04L 67/2847* (2013.01); *H04L 67/2852* (2013.01)

(58) Field of Classification Search
CPC ............. H04L 67/2842; H04L 43/0852; H04L 67/2847; H04L 67/2852; G06F 12/121
See application file for complete search history.

(56) References Cited

U.S. PATENT DOCUMENTS

| | | | |
|---|---|---|---|
| 4,975,830 A | 12/1990 | Gerpheide et al. | |
| 6,047,358 A | 4/2000 | Jacobs | |

(Continued)

FOREIGN PATENT DOCUMENTS

| | | |
|---|---|---|
| EP | 1 223 724 B1 | 5/2005 |
| EP | 1 662 751 B1 | 1/2009 |
| WO | WO-01/1678803 | 3/2001 |

OTHER PUBLICATIONS

Amiri et al., "On space management in a dynamic edge data cache," World Wide Web and Databases International Workshop, 2002, pp. 1-6.

(Continued)

*Primary Examiner* — Jerry B Dennison
(74) *Attorney, Agent, or Firm* — Foley & Lardner LLP; Christopher J. McKenna

(57) ABSTRACT

A method for replacing, refreshing, and managing content in a communication network is provided. The method defines an object policy mechanism that applies media replacement policy rules to defined classes of stored content objects. The object policy mechanism may classify stored content objects into object groups or policy targets. The object policy mechanism may also define metric thresholds and event triggers as policy conditions. The object policy mechanism may further apply replacement policy algorithms or defined policy actions against a class of stored content objects. The media replacement policy rules are enforced at edge content storage repositories in the communication network. A computing device for carrying out the method, and a method for (Continued)

creating, reading, updating, and deleting policy elements and managing policy engine operations, are also provided.

20 Claims, 9 Drawing Sheets

Related U.S. Application Data continuation of application No. 12/250,685, filed on Oct. 14, 2008, now Pat. No. 9,208,104, which is a continuation-in-part of application No. 12/200,304, filed on Aug. 28, 2008, now abandoned.

(56) References Cited

U.S. PATENT DOCUMENTS

| | | |
|---|---|---|
| 6,286,074 B1 | 9/2001 | Batchelor et al. |
| 6,591,288 B1 | 7/2003 | Edwards et al. |
| 6,594,260 B1* | 7/2003 | Aviani, Jr. ......... H04L 67/1002 370/235 |
| 6,622,168 B1 | 9/2003 | Datta |
| 6,708,213 B1 | 3/2004 | Bommaiah et al. |
| 6,721,850 B2 | 4/2004 | Hofmann et al. |
| 6,754,662 B1 | 6/2004 | Li |
| 6,820,123 B1* | 11/2004 | Gourlay ................. H04L 29/06 455/403 |
| 6,842,876 B2* | 1/2005 | Schilit ................ G06F 16/355 715/256 |
| 6,941,338 B1 | 9/2005 | Madsen |
| 6,996,676 B2 | 2/2006 | Megiddo et al. |
| 7,099,926 B1 | 8/2006 | Ims et al. |
| 7,409,380 B1 | 8/2008 | Mazzagatti et al. |
| 7,552,284 B2* | 6/2009 | Petev ................. G06F 12/122 711/100 |
| 7,590,803 B2* | 9/2009 | Wintergerst ......... G06F 12/121 710/57 |
| 7,873,621 B1 | 1/2011 | Datar |
| 8,055,787 B2 | 11/2011 | Victor et al. |
| 8,086,624 B1 | 12/2011 | Hubinette |
| 8,194,534 B2 | 6/2012 | Pandey et al. |
| 8,271,610 B2 | 9/2012 | Cao et al. |
| 8,886,656 B2 | 11/2014 | Worrall |
| 9,143,575 B2 | 9/2015 | Cao et al. |
| 9,208,104 B2 | 12/2015 | Cao et al. |
| 2001/0003194 A1 | 6/2001 | Shimura et al. |
| 2002/0065932 A1 | 5/2002 | Kobayashi |
| 2002/0094813 A1 | 7/2002 | Koshimizu et al. |
| 2002/0138590 A1 | 9/2002 | Beams et al. |
| 2002/0165911 A1* | 11/2002 | Gabber ............. G06F 17/30067 709/203 |
| 2003/0055985 A1 | 3/2003 | Corb et al. |
| 2003/0115346 A1 | 6/2003 | McHenry et al. |
| 2003/0172236 A1 | 9/2003 | Iyengar et al. |
| 2004/0107169 A1 | 6/2004 | Lowe |
| 2004/0128682 A1 | 7/2004 | Liga et al. |
| 2005/0102300 A1 | 5/2005 | Madsen |
| 2006/0010163 A1 | 1/2006 | Herzog et al. |
| 2006/0015904 A1 | 1/2006 | Marcus |
| 2006/0035672 A1 | 2/2006 | Semper |
| 2006/0069746 A1 | 3/2006 | Davis et al. |
| 2006/0136556 A1 | 6/2006 | Stevens et al. |
| 2006/0143389 A1* | 6/2006 | Kilian .................. G06F 12/084 711/130 |
| 2006/0161671 A1 | 7/2006 | Ryman et al. |
| 2007/0006021 A1 | 1/2007 | Nicholson et al. |
| 2007/0060099 A1 | 3/2007 | Ramer et al. |
| 2007/0097983 A1 | 5/2007 | Nylander et al. |
| 2007/0113243 A1 | 5/2007 | Brey |
| 2007/0156965 A1 | 7/2007 | Sundarrajan et al. |
| 2007/0220010 A1 | 9/2007 | Ertugrul |
| 2007/0244929 A1 | 10/2007 | Huang et al. |
| 2007/0250601 A1 | 10/2007 | Amlekar et al. |
| 2007/0294721 A1 | 12/2007 | Haeuser et al. |
| 2008/0008176 A1 | 1/2008 | Lim et al. |
| 2008/0065718 A1 | 3/2008 | Todd et al. |
| 2008/0104634 A1 | 5/2008 | Gajdos et al. |
| 2008/0120364 A1 | 5/2008 | Chari et al. |
| 2008/0125131 A1 | 5/2008 | Guo |
| 2008/0139189 A1* | 6/2008 | Hyatt .................. H04L 67/2852 455/418 |
| 2008/0163290 A1 | 7/2008 | Marko |
| 2008/0188260 A1 | 8/2008 | Xiao et al. |
| 2008/0235292 A1 | 9/2008 | Janin et al. |
| 2008/0267114 A1 | 10/2008 | Mukherjee et al. |
| 2008/0313407 A1* | 12/2008 | Hu ...................... G06F 12/0811 711/133 |
| 2009/0005020 A1 | 1/2009 | McGowan et al. |
| 2009/0006634 A1 | 1/2009 | Parsell et al. |
| 2009/0006813 A1 | 1/2009 | Singhal et al. |
| 2009/0094200 A1* | 4/2009 | Baeza-Yates ..... G06F 17/30902 |
| 2009/0157970 A1* | 6/2009 | Kornegay ............. G06F 12/084 711/130 |
| 2009/0177844 A1* | 7/2009 | Naylor ................ G06F 12/122 711/136 |
| 2009/0305712 A1 | 12/2009 | Franceschini et al. |
| 2010/0023582 A1 | 1/2010 | Pedersen et al. |
| 2010/0030963 A1 | 2/2010 | Marcu et al. |
| 2010/0057926 A1 | 3/2010 | Cao et al. |
| 2010/0057995 A1 | 3/2010 | Cao et al. |
| 2010/0180029 A1 | 7/2010 | Fourman |
| 2011/0013554 A1 | 1/2011 | Koskinen |
| 2011/0098075 A1 | 4/2011 | Bienas et al. |
| 2013/0024500 A1 | 1/2013 | Cao et al. |
| 2016/0088117 A1 | 3/2016 | Cao et al. |

OTHER PUBLICATIONS

CN Office Action for CN Patent Application No. 200980143014.6, dated May 22, 2013 (20 pages).
CN Office Action for CN Patent Application No. 200980143014.6, dated Nov. 13, 2013 (18 pages).
Extended European Search Report for EP Patent Application No. 09810522.4, dated Jul. 30, 2015 (7 pages).
International Preliminary Report on Patentability for International Application No. PCT/US2010/025157, dated May 3, 2011.
International Preliminary Report on Patentability for International Application No. PCT/US2009/054998, dated Aug. 18, 2010.
International Search Report and Written Opinion for International Application No. PCT/US2009/054998, dated Oct. 13, 2009.
International Search Report and Written Opinion for International Application No. PCT/US2009/060646, dated Mar. 11, 2010.
International Search Report and Written Opinion for International Application No. PCT/US2010/025157, dated Jul. 22, 2010.
EP Office Action for EP Appl. No. 09810522.4, dated Feb. 14, 2018.

* cited by examiner

CONTENT REPLACEMENT AND REFRESH POLICY IMPLEMENTATION FOR A CONTENT DISTRIBUTION NETWORK

RELATED APPLICATION INFORMATION

This patent application is a continuation of, and claims priority to and the benefit of U.S. patent application Ser. No. 14/950,896, entitled "CONTENT REPLACEMENT AND REFRESH POLICY IMPLEMENTATION FOR A CONTENT DISTRIBUTION NETWORK," and filed Nov. 24, 2015, which is a continuation of, and claims priority to and the benefit of U.S. patent application Ser. No. 12/250,685, entitled "CONTENT REPLACEMENT AND REFRESH POLICY IMPLEMENTATION FOR A CONTENT DISTRIBUTION NETWORK," and filed Oct. 14, 2008, which is a continuation-in-part of, and claims priority to and the benefit of U.S. patent application Ser. No. 12/200,304, entitled "DIGITAL CUSTOM DATA CONTENT INJECTION MECHANISM FOR A CONTENT DELIVERY NETWORK," and filed Aug. 28, 2008, the contents of all of which are hereby incorporated herein by reference in their entirety for all purposes.

BACKGROUND

A communication network typically includes a core network and at least one access network. The core network is the central part of the communication network and serves as the backbone of the communication network. The core network typically includes high capacity switches and transmission equipment. Each access network serves as a point of contact with the communication network for users. Access networks connect subscribers with their service providers. A communication network may have multiple access networks, serving different sets of users, in communication with a single core network.

A communication network may deliver content to a user. Typically, a user device in an access network will create a request for a certain piece of content, and forward that request through the access network to the core network. Within the core network may be a core services platform; a core services platform is a device located in the core network that performs a variety of services. The core services platform may identify a location where the requested content is stored. Typically, this location is a content storage repository. The content storage repository may be located in the same access network as the user, in a different access network, or in the core network. The core services platform then may coordinate the retrieval of the requested content from the content storage repository, and may coordinate the delivery of the requested content back to the user device.

In order to improve the efficiency of data retrieval, a device in the network may store a cache. Generally, a "cache" is a collection of data duplicating other data stored elsewhere. The cache may temporarily store frequently or recently accessed data for faster access than could be achieved by fetching the original data. Once the data is stored in the cache, future use can be made by accessing the cached copy rather than re-fetching the original data, so that the average access time is shorter.

The device storing the cache ("cache device") may be a file server, though files may be cached on other devices, such as a personal computer or an intermediate network device, such as a router. The cache device may exist in the same access network as the user requesting the content, in a different access network, or in the core network.

Generally, when a user requests content at a user device, the user device checks whether the content is available in the user device's cache. If the content is not available in the cache, or if the content stored in the cache is outdated, the user device may request, through the access network, that the content be provided to the user device. The access network may contain devices with caches as well; if these devices receive the request, they may check whether the requested content is stored in their local cache and if their cached copy of the content is up-to-date. If the content is available and up-to-date, the device containing the cache may simply forward this cached copy to the user device. If not, the access network device may request the content through the core network.

Resource constraints in access networks, coupled with increased amounts of content storage in access network devices, can create cache storage resource contention problems, where multiple different pieces of content contend for limited storage space in the cache. Further, cache content retrieval and renewal in access network devices tends to be a reactive process. Generally, new content is cached only after the old content expires.

SUMMARY

A content management mechanism is provided for a communication network such as, for example, a wireless content delivery network. In the communication network, an electronic device resides in the access network and manages a cache that stores a number of objects. The electronic device may determine a content replacement rule that applies to an object in the cache. The content replacement rule defines a policy for when the object in the cache should be replaced. When it is determined that the object in the cache should be replaced, the electronic device may apply the content replacement rule at a location in the access network to replace the object in the cache.

According to one embodiment, the content replacement rule may include a content object key that defines an attribute of a data object. The content object key may be evaluated against a specified threshold value in order to determine whether a certain policy condition exists. The content replacement rule may further include a policy action that is taken if the policy condition exists. The policy action may be modified using a policy action argument. The content replacement rule may be defined by a user.

According to another embodiment, the determination of when to apply the content replacement rule may be made in response to an event trigger. Such an event trigger may be based on a property of the communication network.

According to another embodiment, different content replacement rules may be applied depending on the type of object that is being replaced. The object may be classified into an object group based on an attribute of the object. Further, a plurality of content replacement rules may be bundled in a content replacement policy. Such a content replacement policy may be accepted by the electronic device. The content replacement policy may define a different content replacement rule for different object groups. Classifying an object into an object group may be done based on a user-defined or system event-triggered classification.

Further, a method for managing content in a communication network is provided. A content replacement rule that applies to an object in the cache is determined. The content replacement rule defines a policy for when the object in the cache should be replaced. The content replacement rule is applied, at a location in the access network, to replace the object in the cache when it is determined that the object in the cache should be replaced.

Further, an electronic device is provided for managing content in a communication network. The electronic device includes storage for storing a content replacement policy and a processor for executing instructions. The instructions may cause the processor to proxy a network transport protocol and apply at least one of the content replacement rules to the object in the cache.

According to another embodiment, instructions for incorporating content replacement rules in a content replacement policy are provided. The instructions include instructions for receiving at least one content replacement rule defining a policy for determining when an object in the cache should be replaced. Further, the instructions may incorporate at least one of the at least one content replacement rules into a content replacement policy, and enforce the content replacement policy on the object in the cache.

An electronic device readable storage medium storing executable instructions for managing a cache is also provided.

DETAILED DESCRIPTION

In exemplary embodiments described herein, an electronic device in a communication network manages a cache that holds or stores a number of objects. The communication network may include a core network and at least one access network. The objects may represent data that has been requested by a user device in one of the access networks. The objects may have been directed to the access network by a core services platform in the core network.

The electronic device, which may be located in the same access network as the user device, in a different access network, or in a core network, may determine a content replacement rule that applies to an object in the cache, the content replacement rule defining a policy for when the object in the cache should be replaced. When it is determined that the object in the cache should be replaced, the electronic device may apply the content replacement rule to replace the object in the cache. The content replacement rule may be specific to a certain object type, and different content replacement rules may be applied to different object types. Further, different content replacement rules may be applied to the same object type in response to different conditions related to the communications network, the object, or the system that the cache resides in.

By providing different content replacement rules for different object types or different conditions, a user or administrator may provide a greater degree of granularity in caching and refreshing data. For example, object types that have a high resource cost to refresh may be refreshed less often than low-cost object types. Further, object types that are likely to become outdated the fastest may be refreshed more often. Because the content replacement rules may be applied in response to a triggering condition, such as the state of the network, content may be replaced proactively. This means that the cached content may be replaced at any time that it is advantageous to replace it, in contrast to waiting to replace the content until it becomes necessary to do so because the content has become stale. For example, if the network is experiencing temporarily high traffic, the caching device may wait for a more opportune time to cache new data. Alternatively, if the network has excess bandwidth, the device may take the opportunity to cache or re-cache objects that will soon become out of date.

Figure 1:
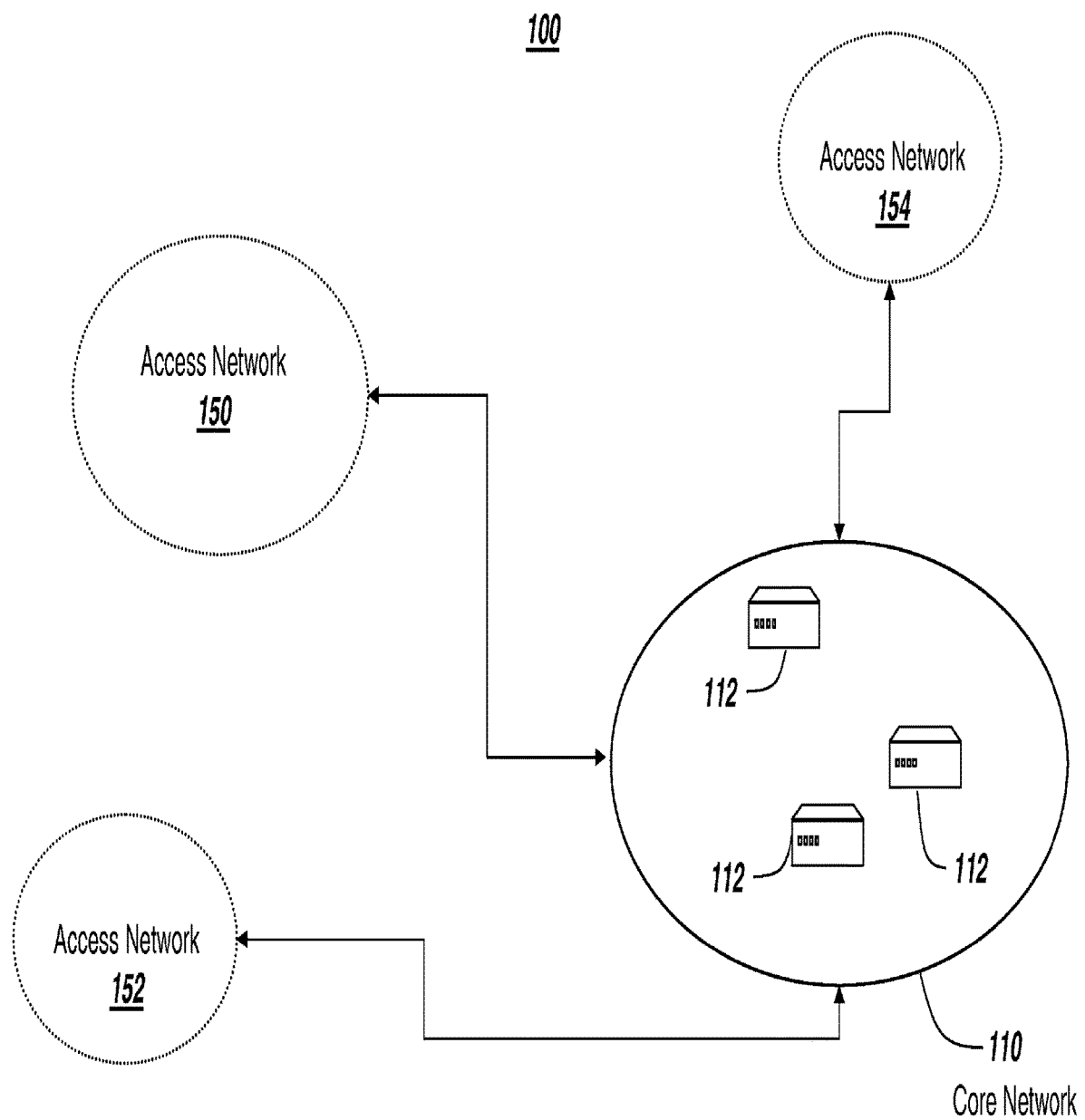
FIG. 1 depicts a communication network suitable for exemplary embodiments.

FIG. 1 depicts a communication network 100 suitable for exemplary embodiments. According to one embodiment, the communication network 100 may be a wireless network, and includes a core network 110 and access networks 150, 152 and 154. Nevertheless, those skilled in the art will appreciate that the communication network may include wired networks as well. According to other embodiments, communication network 100 may include more or fewer access networks. One skilled in the art will recognize that the functionality described herein example is equally applicable in different types of communication networks, such as a network utilizing a WiFi framework, a UTRAN or UMTS framework, a CDMA framework, a WiMax framework, or a UMB framework, among others.

Figure 2:
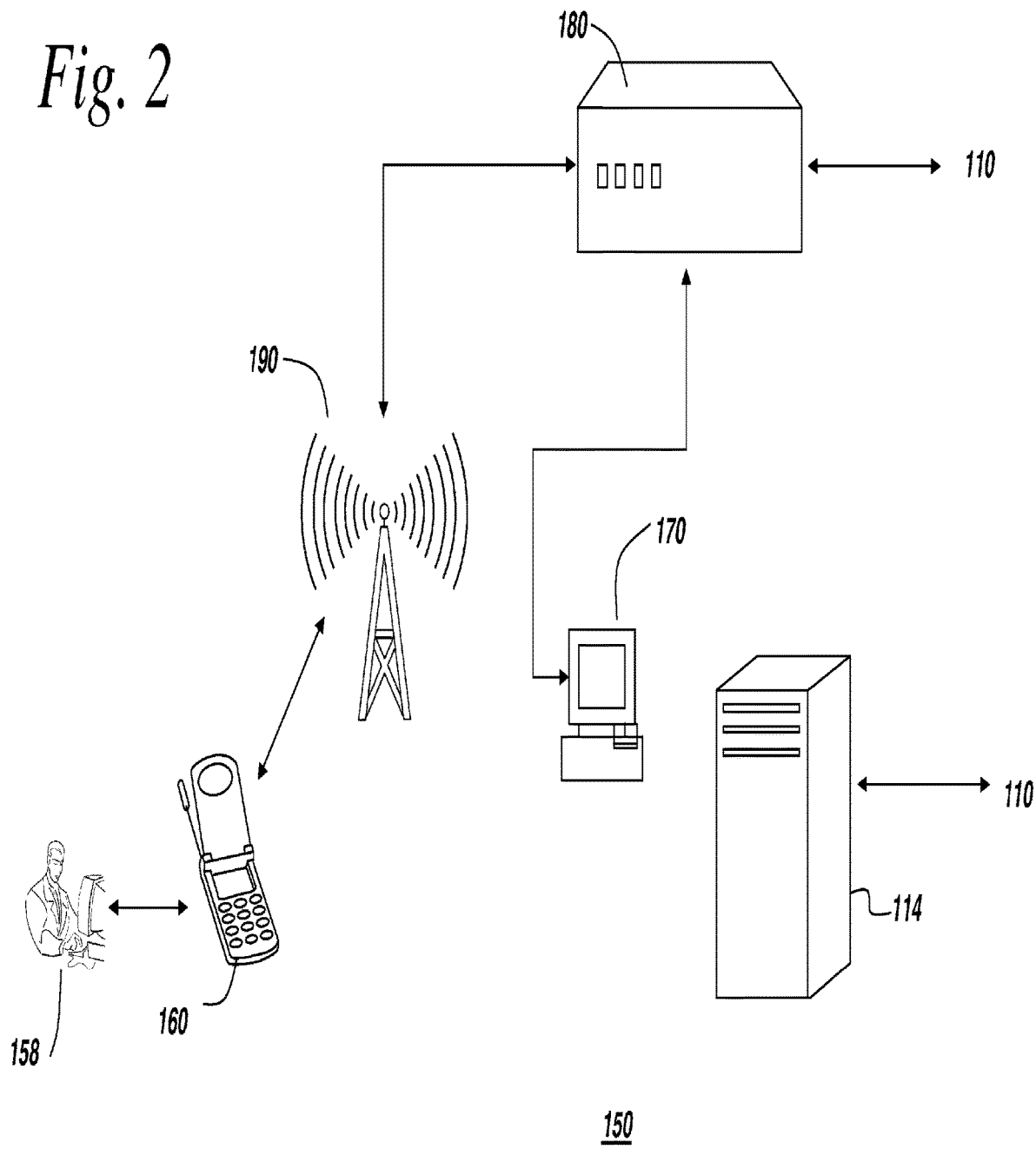
FIG. 2 depicts an access network 150 of FIG. 1 in more detail.

FIG. 2 depicts an exemplary access network 150 in more detail. Each access network serves as the point of contact with the communication network for users, and connect subscribers with their service providers. The communication network 100 may have multiple access networks, serving different sets of users, in communication with a single core network. Examples of access networks include the UMTS Terrestrial Radio Access Network (UTRAN), the GSM Radio Access Network (GRAN), and the GSM Edge Radio Access Network (GERAN).

Figure 3:
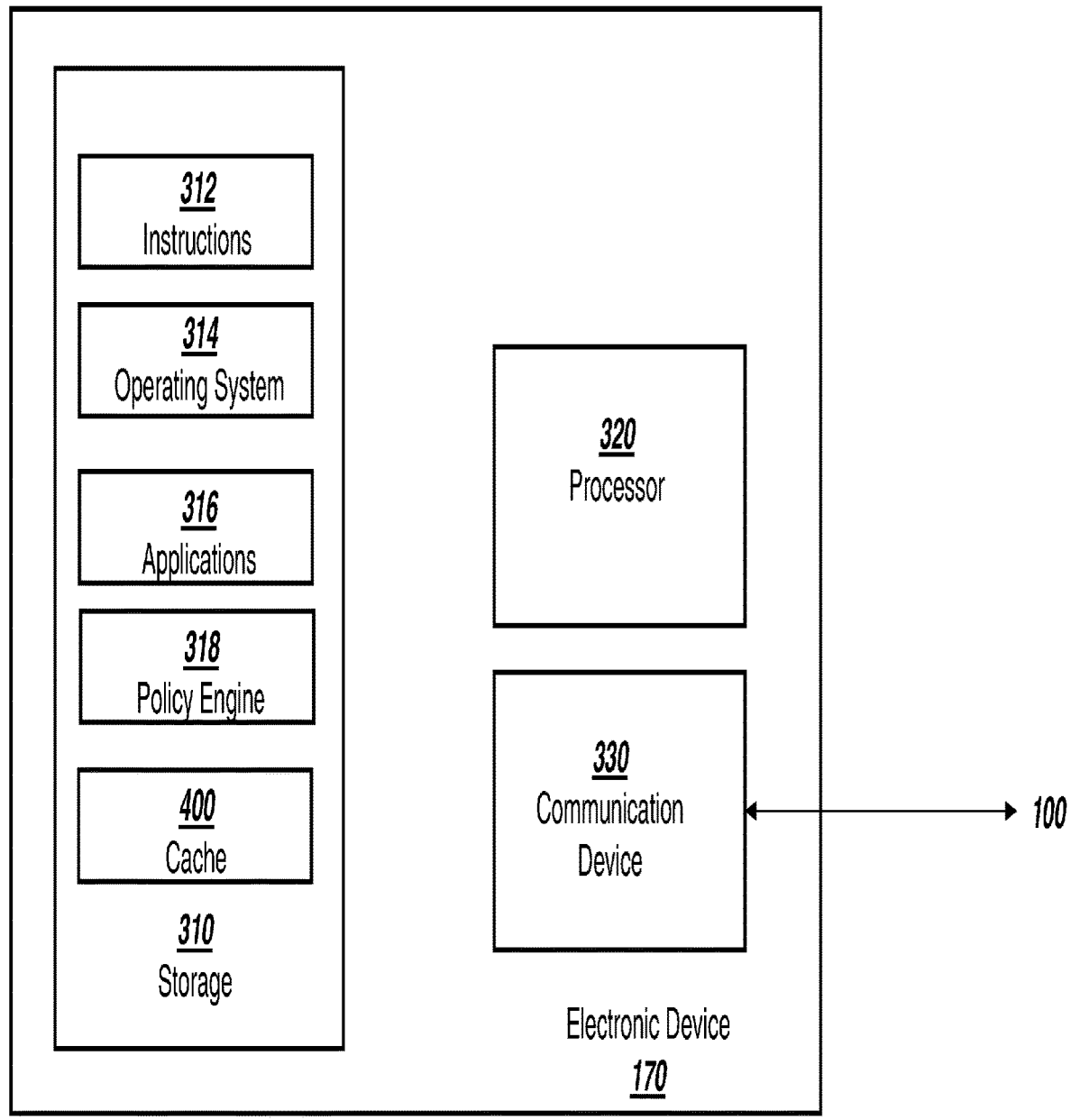
FIG. 3 depicts electronic device 170 of FIG. 1 in more detail.

In the access network 150, an electronic device 170 maintains a cache 400 (depicted in FIG. 3). As will be discussed in more detail below, the electronic device 170 may serve as both the cache maintenance device and the storage device for storing the cache 400. Alternatively, cache maintenance and cache storage may be split into two or more separate electronic devices. Electronic device 170 may be, for example, a server or a router, or may be a custom-designed device. Alternatively, the cache may be maintained at another device in the access network, such as base station 190, intermediate service platform 180, or user device 160.

According to other embodiments, electronic device 170 maintaining the cache 400 is located in the core network 110. Alternatively, electronic device 170 maintaining the cache 400 may be located in any other access network, such as access network 152 or access network 154.

Core services platforms 112 may be, for example, servers within core network 110. Core services platforms 112 may provide services within the core network, such as (but not limited to) fetching data from a storage repository 114 or routing data throughout communications network 100. A cores services platform 112 can take a number of forms, depending on the services to be provided. For example, a core services platform 112 may be a switch or a router. Alternatively, a core services platform 112 may be a server, such as a file server or a mail server, a network bridge, a network hub, or a repeater.

Storage repository 114 may be located within core network 110, or alternatively may be located in an access network. Storage repository 114 may be a file server, though it may be another type of device capable of storing content, such as a personal computer, a mail server, a cellular phone, a personal digital assistant, or a Global Positioning System device.

A user 158 using a user device 160 may interact with access network 150 via a communications device 330 (depicted in FIG. 3), such as a modem, fiber optic connection, or a transmitter and receiver for radio communication. User device 160 may be, for example, but is not limited to, a computing device, a personal digital assistant, a cellular phone, or a Global Positioning System device. User device 160 will typically send and receive data through a base station 190 located in access network 150. Base station 190 may be, for example, a gateway, a cell tower, a Node B, or an Enhanced Node B.

The base station may interact with one or more intermediate service platforms 180 located in access network 150 or may interact directly with core network 110. Intermediate service platforms 180 may perform tasks such as resource management (directing control of the network in a manner that allows the efficient use of network resources), filtering (inspecting incoming and outgoing data in order to remove extraneous, harmful, or harassing data), and routing (directing network traffic towards its appropriate destination). Examples of intermediate service platforms 180 include Radio Network Controllers, bridges, routers, and Virtual Private Network (VPN) servers.

When user 158 using user device 160 requests data, the core network may locate the requested data in a storage repository 114. Storage repository 114 may be in the user device's access network 150, or core network 110, or in a different access network 152. Once storage repository 114 is located, the data may be sent back to the user device 160, potentially after being routed through the core network 110.

Once data has been retrieved from storage repository 114, it may be routed through access network 150 via intermediate service platform 180 or base station 190, or both. Intermediate service platform 180 or base station 190 may maintain a cache 400 for temporarily storing recently used data. For ease of discussion, the Figures depict the cache device as a separate electronic device 170, though electronic device 170 may be the same as intermediate service platform 180 or base station 190.

If the same data is subsequently requested from user device 160, or a different user device in the same access network 150, intermediate service platform 180 or base station 190 may check its cache 400 to see if cache 400 contains an up-to-date copy of the data 450. If cache 400 does contain an up-to-date copy of the data 450, then the copy of the data 450 may be forwarded to the user device 160. Thus, it is not necessary to fetch the same data multiple times, and hence a trip through core network 110 is avoided.

FIG. 3 depicts electronic device 170 in more detail. Electronic device 170 may contain a storage 310 for storing instructions 312 to be executed by a processor 320. Instructions 312 may be storage on one or more electronic device readable media. Examples of electronic device readable media include, but are not limited to, RAM, ROM, magnetic storage media, or optical storage media. Instructions 312 may cause processor 320 to perform a series of steps described in detail below in reference to FIG. 6. Instructions 312 may be in any form that describes how to perform these steps. For example, the instructions may be uncompiled code in any suitable programming language, compiled code, assembly language instructions, or any other type of instructions.

Storage 310 may also store an operating system 314 for operating electronic device 170. Storage 310 may store additional applications 316 for providing additional functionality. Storage 310 also stores a cache 400, which will be discussed in more detail with reference to FIG. 4, and a policy engine 318.

The policy engine 318 may enforce defined cache replacement policies on object groups, take automated cache refresh and replacement actions on groups of objects as defined by policy directives, collect cache metrics and events, and respond to internal system and external event triggers. A user 158 or administrator may interact with the policy engine 318 in a number of ways. For example, an administrator may wish to define different object groups, and apply different object replacement policies to each group. An instruction may be sent to electronic device 170 to define an object group. An exemplary structure for such an instruction is described below, in relation to FIG. 5. Such an instruction may be encapsulated as a data packet and sent over network 100 to electronic device 170, loaded directly onto electronic device 170 via an input device, or otherwise communicated to electronic device 170 in any manner that electronic device 170 is capable of receiving instructions.

Electronic device 170 may have a communication device 330 for communicating with communication network 100. Communication device 330 may be, for example, a modem, an Ethernet connection, a fiber optic connection, a radio antenna, or any suitable means for communicating with a network.

Electronic device 170 may proxy a transport protocol in access network 150. For example, if the network is a UMTS network, electronic device 170 may proxy an Iu-B or an Iu-PS protocol. However, the present disclosure is not limited to implementation in a UMTS network, and may be deployed in any suitable communication network. The transport protocol employed will vary based on the type of communication network utilized.

Figure 4:
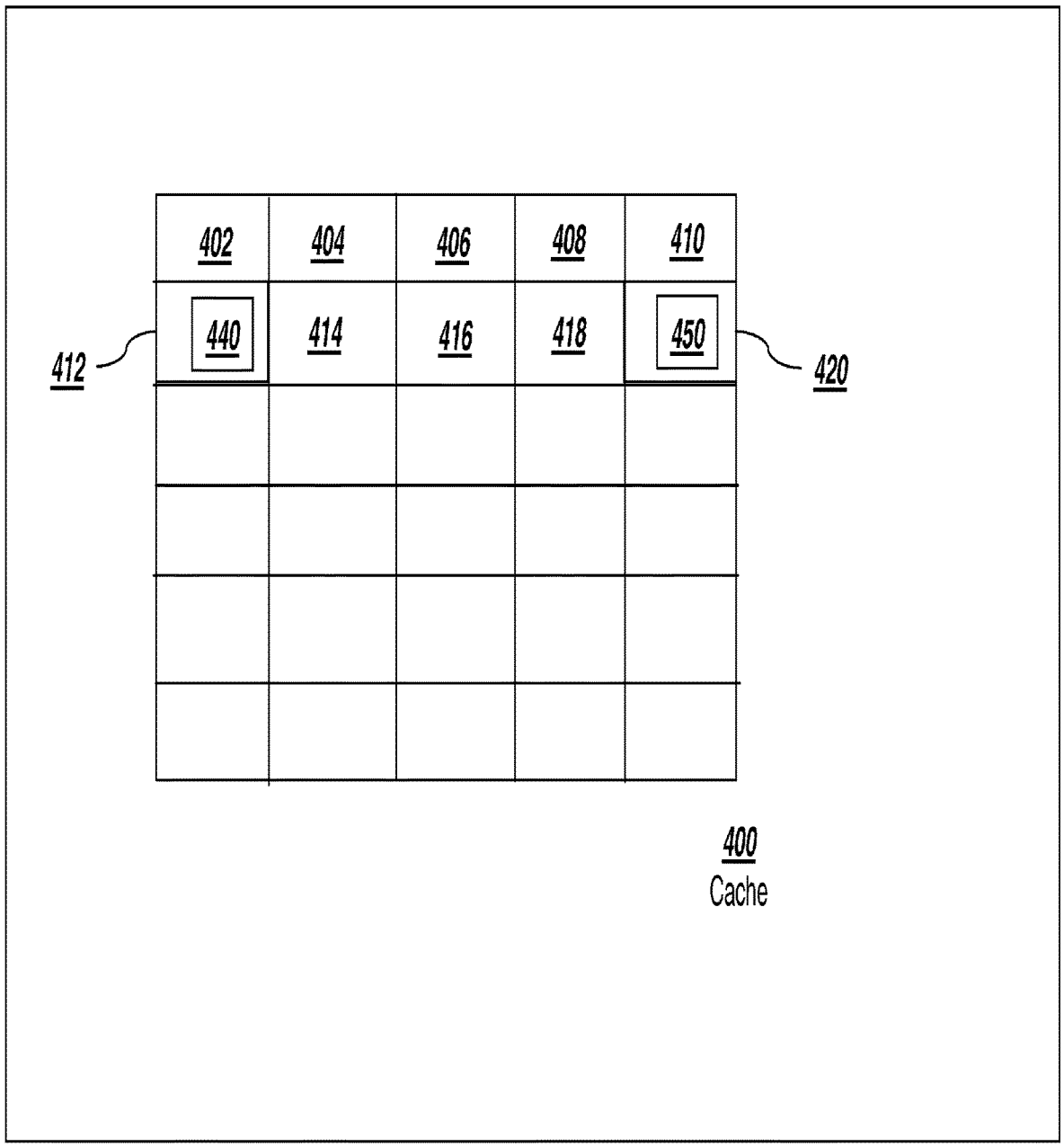
FIG. 4 depicts an example of a cache.

FIG. 4 depicts an example of cache 400. Cache 400 may be stored in storage 310 of electronic device 170. For ease of discussion, the exemplary cache 400 is shown divided into sections 402-420, each section representing an equal amount of storage space. Cached objects 440 and 450 are present in the cache. Objects 440 and 450 represent data that has been recently requested by user device 160.

Cached objects 440 and 450 may represent any type of data than can pass through the network. For example, if user device 160 has requested a web page from the World Wide Web, the request may be forwarded to core network 110, which may locate the web page on storage repository 114. The web page may consist, for example, of two elements, an HTML document 440 and an image present in document 450. These elements will be referred to as "objects." Core network 110 may route these objects 440 and 450 back through access network 150 towards user device 160. As the data passes through intermediate service platform 180, intermediate service platform 180 forwards this data to electronic device 170 to be cached.

Alternatively, cache 400 may be maintained directly on intermediate service platform 180. In the present example, cache 400 is maintained on electronic device 170, which is shown separately from the intermediate service platform 180 for ease of discussion.

Because electronic device 170 (depicted in FIG. 3) maintains cache 400 storing objects 440 and 450, future requests for the web page that objects 440 and 450 represent may be intercepted at intermediate service platform 180 (FIG. 2). These future requests may come from user device 160 (FIG. 2), or any other user device in access network 150 (FIG. 2). The electronic device 170 (FIG. 3) will determine whether objects 440 and 450 are still up to date using any of a number of methods. For example, some objects carry a "time-to-live" (TTL) tag that specifies how long the object will be considered valid before it becomes out-of-date or "stale." Alternatively, a user device may specify when an object should be forcefully refreshed in cache 400. Other conditions that may indicate that an object is out-of-date will be discussed in more detail in relation to FIG. 6.

If the cached objects 440 and 450 are still up to date, then cached objects 440 and 450 may be provided back to the requesting user device, thus preventing the need for a request to be fulfilled through core network 110.

The cache may be maintained by specifying cache replacement policy statements. These cache replacement policy statements may define cache replacement policy actions to be taken if certain conditions are met. Cache replacement policy actions may be applied to each data object in cache 400, or may be applied to a subset of the objects in cache 400. For example, the cache replacement policy action may be applied only against objects of a certain object type, or object "group." Object groups are discussed in more detail below in reference to FIG. 8. Alternatively, multiple cache replacement policy actions may be defined for different object groups.

Figure 5:
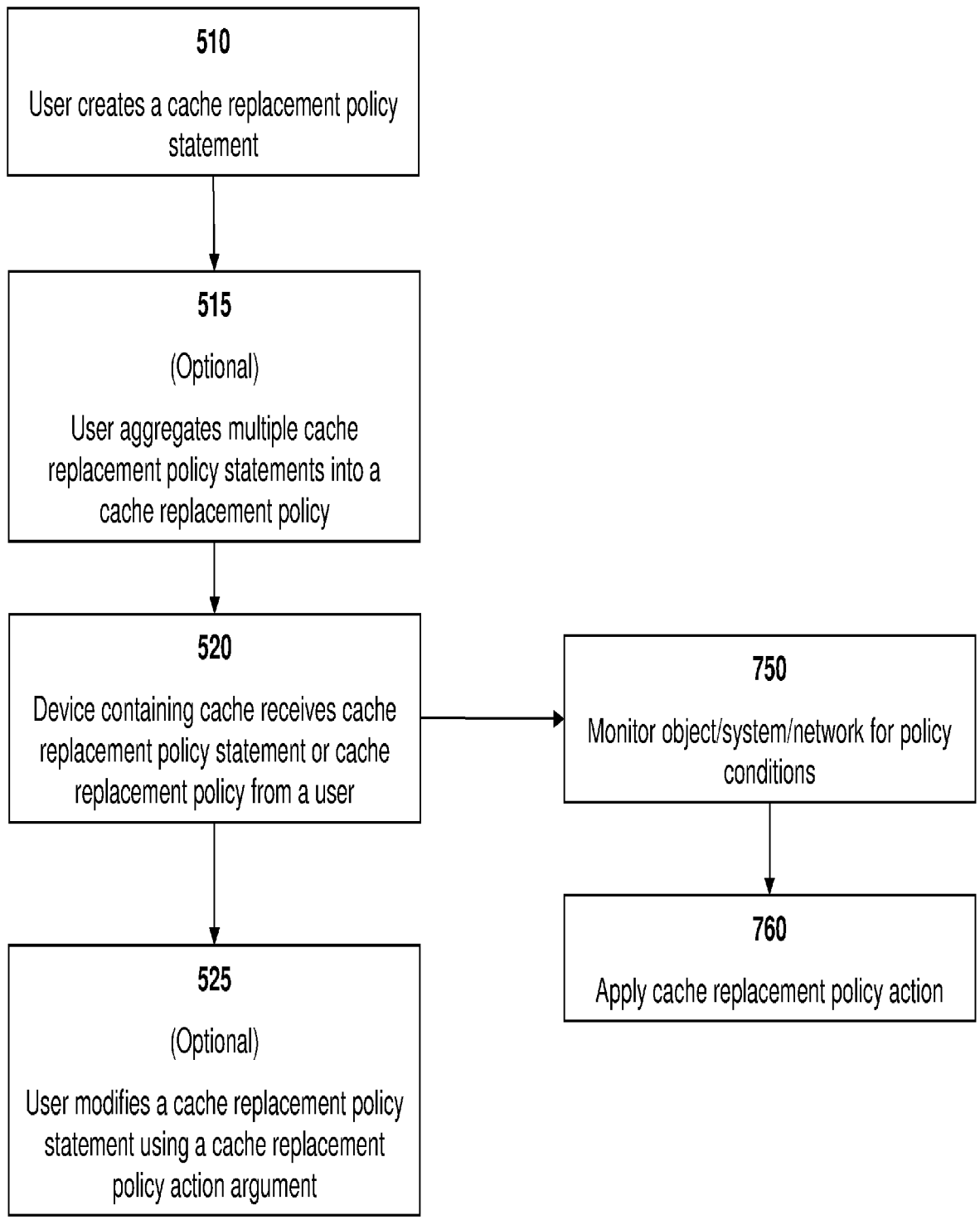
FIG. 5 depicts a flow chart of steps that may be performed in order to manage a cache 400.

FIG. 5 depicts a flow chart of steps that may be performed in order to manage a cache 400. In order to manage the cache 400, the user may write cache management policy statements (step 510). Cache management policy statements provide a way to interact with the policy engine in order to define how the cache 400 should be maintained. Cache management policy statements may provide a definition of object classes, a set of defined policy statements including policy rules, policy condition definitions, object keys, policy condition threshold values, policy actions, and, optionally, policy action arguments. Each of these elements will be discussed in more detail below. Cache management policy statements may be taken together to define a cache management policy (step 515), which may be received by, and stored on, electronic device 170 (step 520). Alternatively, the cache management policy statements or the cache management policy may be stored elsewhere.

Figure 6:
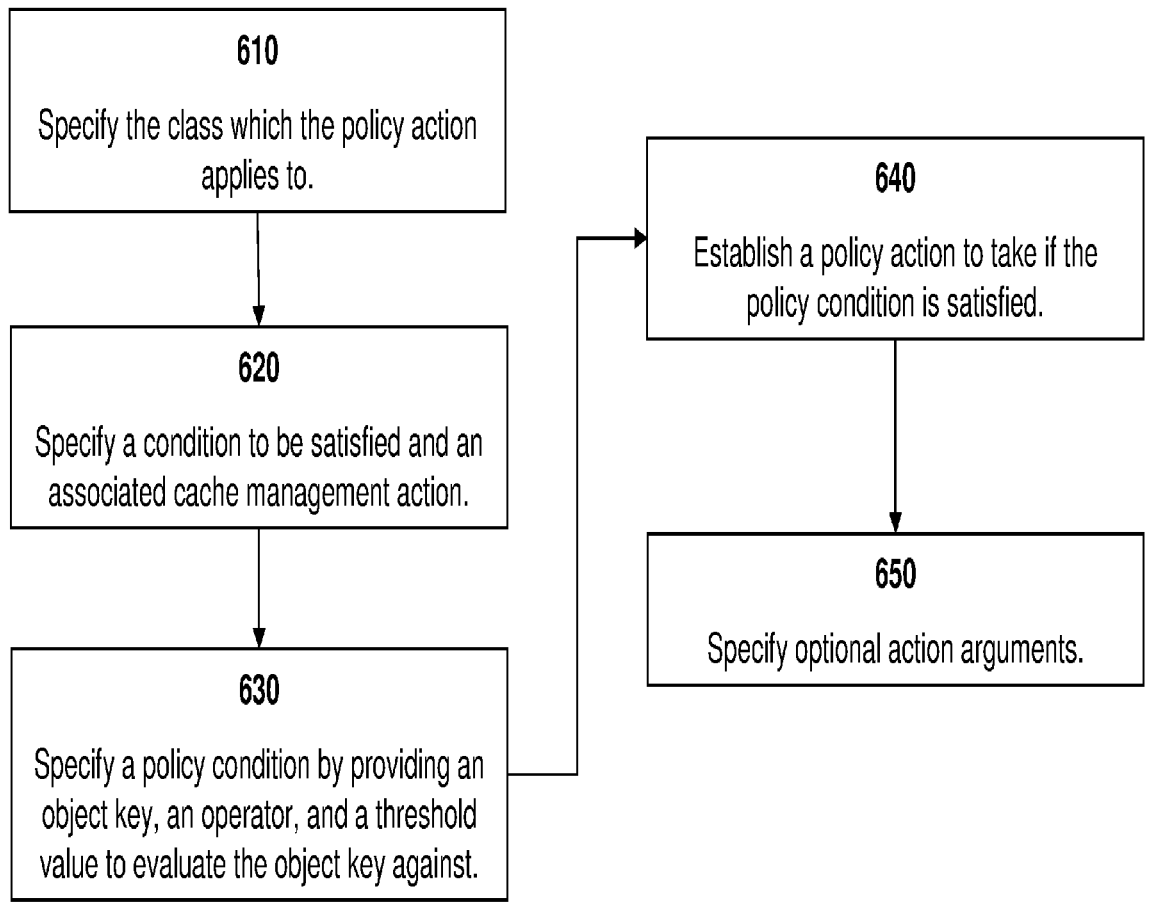
FIG. 6 depicts steps that may be performed by a user in order to define cache management policy statements that specify the details of how to manage the cache.

FIG. 6 depicts steps that may be performed by a user in order to define a cache management policy statement that specifies the details of how to manage the cache. The user may provide an object class definition that defines targets for policy actions (step 610). The definition groups cached data objects based on their type. Multiple different types may be included in a single object class definition. The use of object class definitions allow the application of policy rules against object groups, rather than individual objects. An example of a generic object class definition statement may be:
<class>::=<object type attributes>

At step 620, the user may specify a condition to be satisfied and an associated cache management action. A policy action will be taken if the defined condition is met. An example of a generic object class definition may be:
<policy>::=<condition> <action>

A user may use an object key and a threshold value to determine a condition of a network, system, device, or object. An object key is an attribute taken from an object request or response header (for example, <object key>::=<http/rtsp_request_key>|<http/rtsp_response key>). A threshold value is the value defined to be matched against the key, and may be defined as:
<threshold value>::=<STRING|INTEGER>

At step 630, the user may provide a policy condition definition. Policy condition definitions define a way to evaluate an object key against a specified threshold value. The policy condition definitions may use a relation operator to evaluate the object key against the threshold value. For example, a policy condition definition may look like:
<condition>::=<object key> <operator> <threshold value>

At step 640, the user may establish a policy action. A policy action defines policy enforcement actions to take in the case that the condition from step 630 is satisfied. It may specify a cache algorithm to be applied to an object or object class, or specify an automated cache refresh action. For example, a policy action may appear as:
<policy action>::=<ALGORITHM|REFRESH> <action arguments>

At optional step 650, a user may specify action arguments. Action arguments are an optional part of a cache management policy statement. These arguments modify a policy action, or set a new priority for the policy action, so that some policy actions may take precedence over others. For example, if two policy actions are defined to be taken in response to a certain triggering condition, the policy action with the higher priority should be executed in preference to the policy action with a lower priority. This may mean that the policy action with higher priority is executed before the lower priority policy action, or that the higher priority policy action is executed instead of the lower priority policy action.

An action argument may appear as:
<action arguments>::=<STRING>

Other parts of a cache management policy statement may include a name for the statement or the name of the policy to which the statement belongs. Examples of cache management policy statements follow:
class image="*.bmp" & "*.jpg" & "*.gif" & "*.tiff";
policy refresh="high available bandwidth" "refresh images in cache";
threshold bandwidth="100 megabytes per second";
condition "high available bandwidth"=[http/rtsp_response key]>bandwidth;
action "refresh images in cache"="least frequently used" "last five minutes";
arguments="priority=1";

After defining the above elements, user 158 might issue a command to transmit this Policy Statement to electronic device 170 (step 520). Alternatively, the user may define several policy statements and transmit them together. For example, the user may define a policy regarding when to refresh images based on the latency of the system in this way:
class image="*.bmp" & "*.jpg" & "*.gif" & "*.tiff";
policy refresh="low latency" "refresh images in cache";
threshold latency="200 ms";
condition "low latency"=[http/rtsp_response key]<latency;
action "refresh images in cache"="size";
arguments="priority=2";

The priority of 2 in the above example indicates that if the first policy and the second policy conflict, the first policy should be applied in preference to the second.

Further, user 158 may define a policy regarding when to refresh HTML documents. Once the user has defined these three cache management policy statements, the user may package these cache management policy statements together as a cache management policy.

If a user 158 later decides to change certain aspects of cache management policy statements that have already been issued, the user 158 may do this by issuing an action argument (step 525). A user may modify policy statements by issuing a new policy statement to overwrite the existing policy statement, or by modifying the existing policy statement through action arguments.

When electronic device 170 receives the cache management policy identified above (step 520), electronic device 170 may store the cache management policy and begin monitoring for the triggering conditions identified in the policy (step 550). In the above example, electronic device 170 would begin monitoring access network 150 to determine when the bandwidth available exceeded 100 megabytes per second, and might begin monitoring messages sent over the network to determine when the latency falls below 200 ms. When either of these conditions are met, electronic device 170 may take the action specified in the appropriate policy statement.

One having ordinary skill in the art will see that multiple policy statements may be defined for the same object type, and multiple policy statements may be defined for different object types. In this way, an administrator might decide that images, which have a higher cost to cache than HTML documents, should be proactively refreshed when the network has excess bandwidth. Within the object type "images," perhaps the largest images will be refreshed only when network bandwidth rises to a very high level, while smaller images may be refreshed when network bandwidth rises to an intermediate level (e.g., images over 10 MB should only be refreshed if network bandwidth is higher than 150 MBps, while images less than 10 MB should be refreshed once the network bandwidth is higher than 90 MBps). On the other hand, because HTML documents tend to be less resource intensive to fetch, HTML documents can wait to be refreshed until their time-to-live tag indicates that they have become stale.

Figure 7:
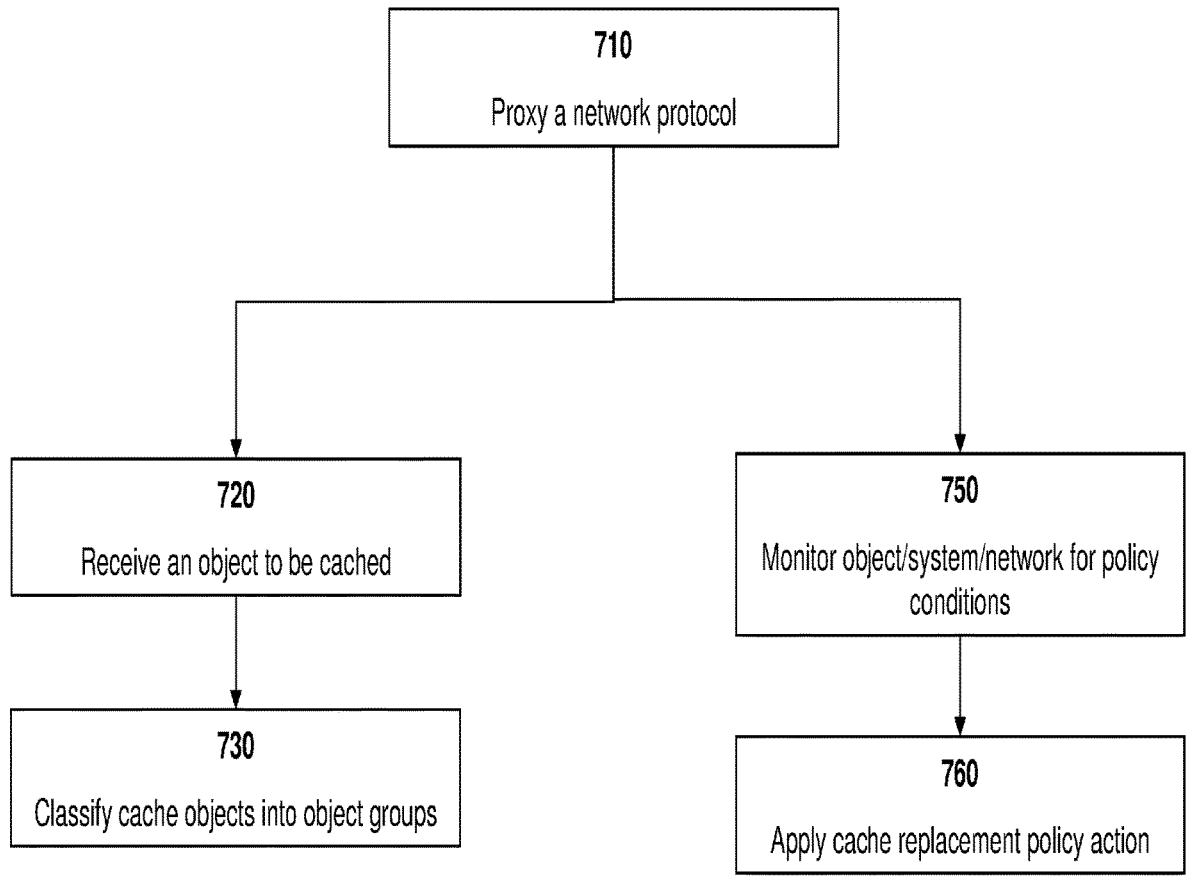
FIG. 7 depicts a flow chart steps that may be performed by the electronic device of FIG. 3.

FIG. 7 depicts a flowchart of procedures that may be carried out by electronic device 170 (FIG. 3). According to one embodiment, storage 310 (FIG. 3) of electronic device 170 may store executable instructions 312 (FIG. 3) for causing electronic device 170 to proxy a network protocol (step 710). As electronic device 170 receives data running through network 100 (FIG. 1), electronic device 170 (FIG. 3) may build a data object cache 400. At step 720, instructions 312 (FIG. 3) may cause processor 320 to receive an object to be cached. At step 730, the object may optionally be classified into an "object group." These object groups will be discussed in more detail below, in reference to FIG. 5.

After a number of requests for data have been fulfilled, cache 400 (FIG. 4) may become filled with data. Additionally, some data objects in cache 400 may expire, and thus need to be either re-cached or abandoned. One option for maintaining cache 400 is to simply wait until the cache is full, or until an object that is requested if found to be out-of-date (or "stale"), and apply an algorithm that selects an object from the cache 400 to replace.

Alternatively, at step 750, electronic device 170 (FIG. 3) may monitor the data objects in the cache, the properties of the electronic device 170, or the network. When a certain triggering condition is met, the electronic device 170 may apply an algorithm to select an object in the cache 400 (FIG. 4) for replacement, in response to the triggering condition. These triggering conditions will be discussed in more detail below, with reference to FIG. 9. Step 750 allows for electronic device 170 (FIG. 3) to take proactive action to maintain the cache. For example, instead of waiting for an out-of-date object to be requested, electronic device 170 may monitor network 100 in order to determine when excess bandwidth is available, and update cache 400 (FIG. 4) when network traffic is low.

Thus, at step 760 a cache replacement algorithm or cache object refresh process may be applied against the data objects in the cache. Such an algorithm or process is referred to herein as a "cache replacement policy action." Some examples of cache replacement policies that may inform cache replacement policy actions are described in detail below. For the algorithms presented below, consider two objects 440 and 450 present in a cache 400 (FIG. 4). Examples are provided describing the management of the cache in relation to how each algorithm would choose which of the two objects to replace, once it is determined that an object must be updated.

The Least Recently Used (LRU) algorithm replaces the object that has not been used for the longest time, counting backwards from the present. For example, if object 440 was last requested by a user device 160 at 0:20 and object 450 was last requested by a user device 160 at 0:40, LRU would replace object 440. Note that it is not necessary that the same user device request the objects; object 450 might have been requested by a user device other than user device 160 at 0:40, and the same results would follow.

The Least Frequently Used (LFU) algorithm replaces the object that has been least frequently used over a certain time window. This might be a window stretching back in time from the present (e.g., "over the last five minutes") or a window over some other time period (e.g., "from ten minutes ago to five minutes ago"). The latter option allows the network to ignore certain events—for instance, if there is a spike in requests for a certain kind of data content that is not likely to be repeated. For example, if object 440 was requested twenty times in the last five minutes, and object 450 was requested thirty times in the last five minutes, LRU would replace object 440. The Frequency Based Replacement (FBR) algorithm maintains LRU ordering but discard an object based on frequency of use (LRU+LFU). This policy balances the amount of use of an object with the amount of time since usage.

The Greedy Dual Size (GDS) algorithm assigns a cost/size value to objects. For example, the policy may take the object reference count (the number of times that the object is currently being referenced) plus the object cost (a value that reflects how difficult it is to recache or serve the object) divided by the object size (e.g., the size of the object in megabytes). The Greedy Dual Size+Aging (GDS-aging) algorithm adds a cache age factor to GDS. The cache age factor may be, for example, the amount of time that the object has been in the cache since it was originally cached, or since it was most recently refreshed. This allows the policy to minimize the influence of recently popular documents.

The Size algorithm discards the largest object. Instead of choosing an object to refresh, the Size algorithm chooses an object to eliminate from the cache. Size may be measured, for example, based on the size of the object in megabytes. A similar algorithm is Random (RAND), which selects a random object to be discarded.

Alternatively, a user or administrator may specify Explicit Cache Object Refresh Actions. These Explicit Cache Object Refresh Actions instruct the caching device to collect remote data objects from their original source, refresh cache attributes of certain data objects, discard certain data objects, or substitute administratively-defined cache attribute values for cached object values.

Figure 8:
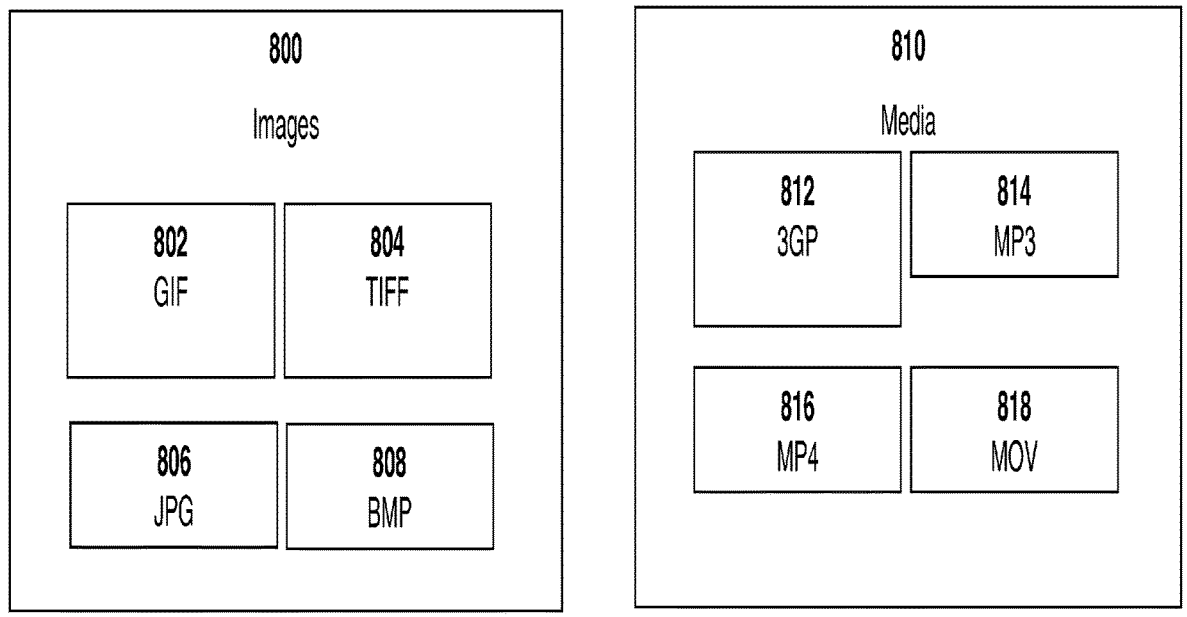
FIG. 8 depicts object groups for use in exemplary embodiments.
Figure 8:
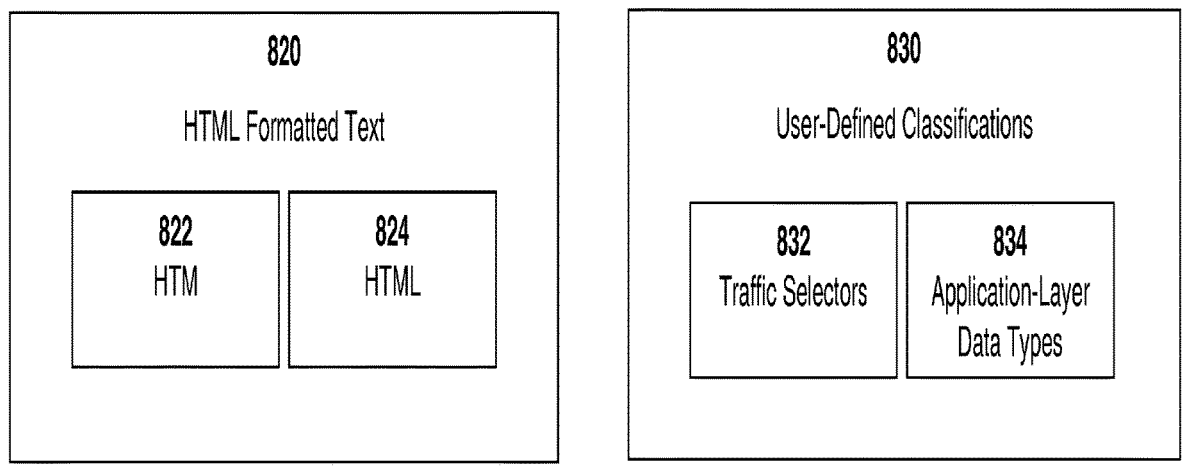

FIG. 8 depicts exemplary object groups for use in an illustrative embodiment. For example, object groups include images 800, such as images in the GIF 802, TIFF 804, JPG 806, or BMP 808 formats. "Media" 810 may include 3GP media 812, MP3 music objects 814, MP4 multimedia objects 816, or QuickTime movies 818. Examples of HTML formatted text 820 include HTM 822 and HTML 824 formatted documents.

Further, it is possible to have user-defined classifications for object groups 830. Such user-defined classifications 830 could be, for example, traffic selectors 832 based on the data object's origin host, or the IP address of the data packet that contained the data object. Additionally, user-defined classifications 830 could include application-layer data types 834, such as MIME data types.

Figure 9:
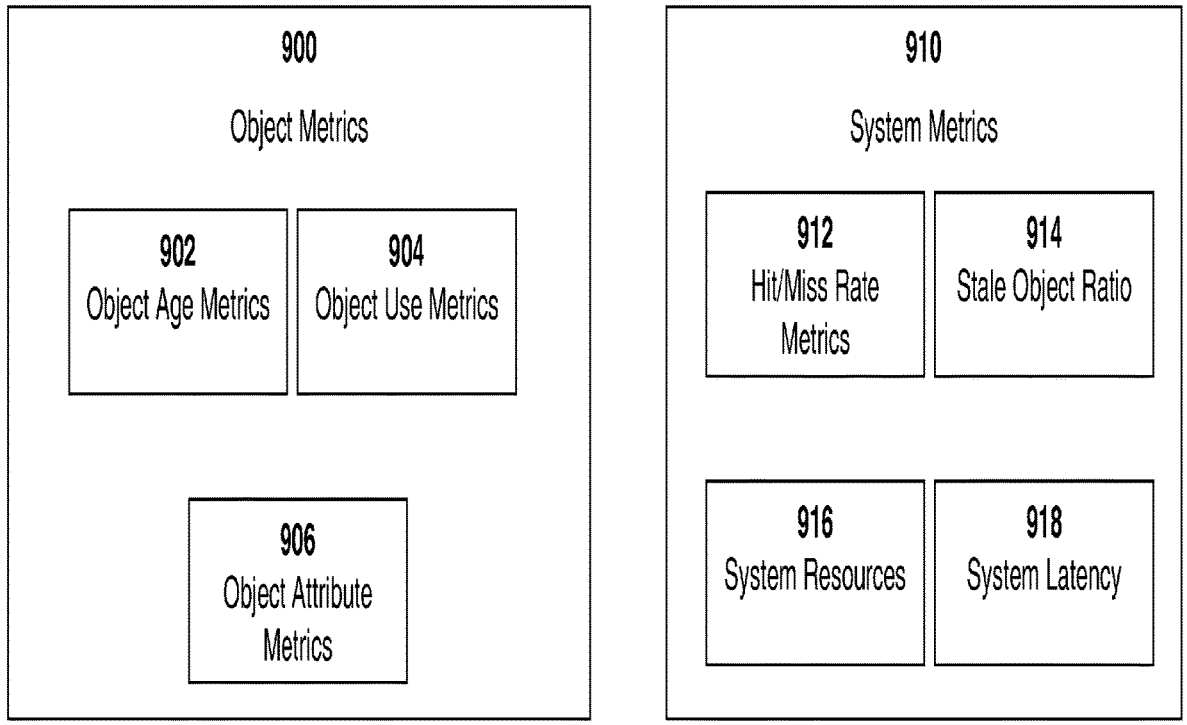
FIG. 9 depicts policy conditions for use as metric thresholds or event triggers.
Figure 9:
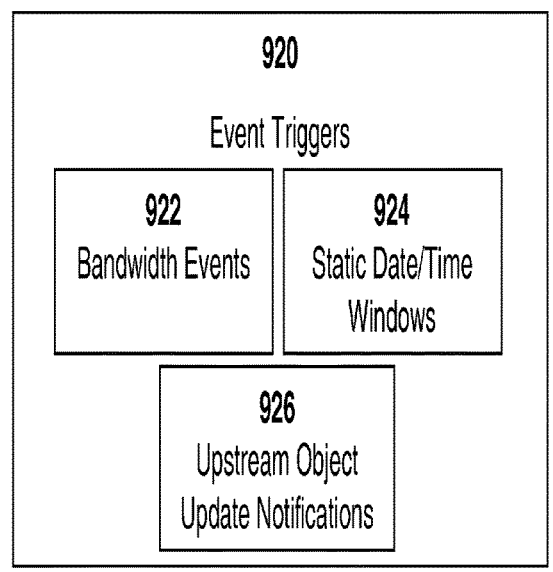

FIG. 9 depicts policy conditions for use as metric thresholds or event triggers. The policy conditions may include object metrics 900 that define when to replace or refresh an object based on one or more attributes of the object itself, system metrics 910 that define when to replace or refresh objects based on attributes of the device that the cache is being stored on, or event triggers 920 that replace or refresh cache objects based on the happening of an event external to the caching device.

Object metrics 900 may include object age metrics 902, object use metrics 904, or object attribute metrics 906. Object age metrics 902 may include such attributes as the object local age. Object use metrics 904 may include attributes such as object use frequency, object last-used time, object delivery attributes such as early user aborts, and object retrieval time. Object attribute metrics 906 may include, for example, object size or object header attributes, such as header tags like Age, Expires, Last-Modified/E-Tag, Date, and Cache Control.

System metrics 910 may include hit/miss rate metrics 912, the stale object ratio 914, system resource attributes 916, or system latency 918. Hit/miss rate metrics 912 may be such attributes as the system's byte hit rate or object hit rate, or byte miss rate or object miss rate. The stale object ratio 914 represents the ratio of out-of-date or stale objects to the size of the cache 400. System resource attributes may include the CPU workload of the electronic device 170, or the available bandwidth of the system.

Event triggers 920 may include bandwidth events 922, static date/time windows 924, or upstream object update notifications 926. Bandwidth events 922 may include dynamic link bandwidth events such as link utilization threshold crossings measured within a certain time period. Static date/time windows 924 may include, for example, a defined object refresh period. Upstream object update notifications 926 include such events as an inbound notification of origin content change, for example a notification from the core network or a storage repository 114.

The ability of a device located in the access network to predict and observe the availability of excess network resources presents an opportunity to proactively maintain cached object freshness with minimal impact on user data flows. In addition, maintaining the cache at a higher degree of granularity allows for cached objects to be refreshed on a "per object class" basis in a dynamic manner. By using user-configured policy definitions, it is possible to define a proactive retrieval and refresh policy.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the appended claims and the applicable rules of law.

The invention claimed is:

1. A method comprising:
   (a) establishing, by a device comprising a cache storing a plurality of objects, by a user a definition of a policy for replacing one or more objects of the plurality of objects stored in the cache based on a type of object, the policy comprising a definition by the user of each of the type of object, one or more conditions to be met, a threshold for the one or more conditions and an action to one of refresh or replace the one or more objects of the type of object in the cache responsive to the one or more conditions meeting the threshold;
   (b) identifying, by the device, that the one or more conditions of the policy specify a system metric and the threshold for the system metric, wherein the system metric comprises an attribute of the device;
   (c) monitoring, by the device responsive to identifying the system metric and the threshold defined by the user in the policy, the system metric in comparison to the threshold at least while the system metric is below the threshold;
   (d) determining, by the device responsive to monitoring, that the system metric of the one or more conditions of the policy has reached the threshold; and
   (e) taking, by the device responsive to the determination that the system metric of the one or more conditions of the policy has reached the threshold, the action of the policy to one of refresh or replace the one or more objects of the type of object in the cache of the device.

2. The method of claim 1, wherein the attribute of the device comprises one of a workload of a processor of the device or available bandwidth of the device.

3. The method of claim 1, wherein the attribute of the device comprises a latency of the device.

4. The method of claim 1, wherein the attribute of the device comprises one of the following: hit and miss rate, stale object rate, byte hit rate, object hit rate, byte miss rate or object miss rate.

5. The method of claim 1, wherein (c) further comprises initiating monitoring, by the device, responsive to identification of the system metric of the policy.

6. The method of claim 1, wherein (c) further comprising monitoring a link bandwidth in comparison to the threshold comprising a link utilization threshold.

7. The method of claim 1, wherein (c) further comprising monitoring bandwidth in comparison to the threshold comprising a number of bytes per second.

8. The method of claim 1, wherein (c) further comprising monitoring latency in comparison to the threshold comprising a number of milliseconds.

9. The method of claim 1, wherein (e) further comprises taking the action of the policy to replace the one or more objects in the cache corresponding to a type of object and using a predetermined algorithm, wherein the predetermined algorithm comprises one of a least recently used, least frequently used, greedy dual size or a size algorithm.

10. The method of claim 1, wherein (e) further comprises taking the action of the policy to refresh the one or more objects in the cache corresponding to a type of object based on one of a last update to the one or more objects or a size of the one or more objects.

11. A system comprising:
- a device comprising a processor, coupled to memory and a cache storing a plurality of objects;
- a policy of the device configured by a user to replace one or more objects of the plurality of objects stored in the cache based on a type of object, the policy comprising definition by the user of each of the type of object, one or more conditions to be met, a threshold for the one or more conditions and an action to one of refresh or replace the one or more objects of the type of object in the cache responsive to the one or more conditions meeting the threshold;
- wherein the device is configured to:
  - identify that the one or more conditions of the policy specify a system metric and the threshold for the system metric, wherein the system metric comprises an attribute of the device;
  - monitor, responsive to identifying the system metric and the threshold defined by the user in the policy, the system metric in comparison to the threshold at least while the system metric is below the threshold;
  - determine, responsive to monitoring, that the system metric of the one or more conditions of the policy has reached meets the threshold; and
  - take, responsive to the determination that the system metric of the one or more conditions of the policy has reached the threshold, the action of the policy to one of refresh or replace the one or more objects of the type of object in the cache of the device.

12. The system of claim 11, wherein the attribute of the device comprises one of a workload of a processor of the device or available bandwidth of the device.

13. The system of claim 11, wherein the attribute of the device comprises a latency of the device.

14. The system of claim 11, wherein the attribute of the device comprises one of the following: hit and miss rate, stale object rate, byte hit rate, object hit rate, byte miss rate or object miss rate.

15. The system of claim 11, wherein the device is further configured to initiate monitoring responsive to identification of the system metric of the policy.

16. The system of claim 11, wherein the device is further configured to monitor a link bandwidth in comparison to the threshold comprising a link utilization threshold.

17. The system of claim 11, wherein the device is further configured to monitor bandwidth in comparison to the threshold comprising a number of bytes per second.

18. The system of claim 11, wherein the device is further configured to monitor latency in comparison to the threshold comprising a number of milliseconds.

19. The system of claim 11, wherein the device is further configured to take the action of the policy to replace the one or more objects in the cache corresponding to a type of object and using a predetermined algorithm, wherein the predetermined algorithm comprises one of a least recently used, least frequently used, greedy dual size or a size algorithm.

20. The system of claim 11, wherein the device is further configured to take the action of the policy to refresh the one or more objects in the cache corresponding to a type of object based on one of a last update to the one or more objects or a size of the one or more objects.

* * * * *